United States Patent

[11] 3,588,122

[72] Inventors L.C. James Kingsbury;
Adelore F. Petrie, Decatur, Ill.

[21] Appl. No. 795,373
[22] Filed Nov. 18, 1968
[45] Patented June 28, 1971
[73] Assignee General Electric Company
[32] Priority Nov. 22, 1966
[33] England
[31] 520,139
Continuation of application Ser. No. 518,351, Jan. 3, 1966, now abandoned.

[54] PORTABLE RECORDING APPARATUS AND MEDIA THEREFOR
4 Claims, 11 Drawing Figs.

[52] U.S. Cl. .......... 274/39, 274/42
[51] Int. Cl. .......... G11b 3/00
[50] Field of Search .......... 274/9, 1.7, 23.2, 39, 41, 42, 1

[56] References Cited
UNITED STATES PATENTS
3,227,458 1/1966 Dimitracopoulos et al. ... 274/9
FOREIGN PATENTS
404,515 1/1934 Great Britain .......... 274/42

*Primary Examiner*—Harry N. Haroian
*Attorneys*—Stanley C. Corwin, Joseph W. Shanley, Frank L. Neuhauser, Oscar B. Waddell and Joseph B. Forman

ABSTRACT: A recording and reproducing apparatus for embossable recording and playback of sound relative to a thin plastic disc, the thin plastic record disc being of noncircular periphery to enable its periphery to be driven by a similarly configured recess of a turntable. The record disc may be specially configured and dimensioned for compact cooperation with a standard sized mailing envelope.

INVENTORS
L. C. JAMES KINGSBURY
ADELORE F. PETRIE
BY Thomas A. Briody
HIS ATTORNEY INVENTORS
L. C. JAMES KINGSBURY
ADELORE F. PETRIE
BY Thomas A. Briody
HIS ATTORNEY INVENTORS
L. C. JAMES KINGSBURY
ADELORE F. PETRIE
BY Thomas A. Briody
HIS ATTORNEY INVENTORS
L. C. JAMES KINGSBURY
ADELORE F. PETRIE
BY Thomas A. Briody
HIS ATTORNEY

PORTABLE RECORDING APPARATUS AND MEDIA THEREFOR

The present application is a continuation of our copending application Ser. No. 518,351 filed Jan. 3, 1966 now abandoned and assigned to the same assignee as the instant application.

This invention relates to phonograph devices, and more particularly to a compact portable recording and reproducing apparatus of the type wherein a thin plastic disc is embossed by a recording head which forms a spiral sound track upon the surface of the disc.

There are numerous occasions when persons in various occupations, such as housewives and business men, find need for quickly and conveniently recording messages or letters. For such a purpose it is important that the recording device be sturdy, durable, portable, and very compact in size. It is also desirable that such a device should be extremely simplified in operation, thereby enabling virtually anyone to readily and efficiently utilize the equipment. It is also very desirable that records usable with the device should be economical and readily mailable.

Accordingly, it is an important object of the present invention to provide an improved, compact, and portable phonograph device.

It is another object of this invention to provide an improved portable recording and reproducing apparatus of the embossable disc type, which is constructed in such a manner that it is extremely compact in size.

It is an additional object of this invention to provide an improved portable recording and reproducing apparatus of the embossable disc type, which is extremely efficient in operation.

It is still another object of this invention to provide a new and improved recording device structure and arrangement for driving a disc-type record.

It is yet another object of the present invention to provide a novel disc-type record which is economically and conveniently mailable.

A still further object of this invention is to provide an improved embossable disc-type recording and reproducing device, which due to its relative simplicity may be manufactured at a reduced cost.

In carrying out the present invention, in one form thereof, there is provided a recording and reproducing device having a revolvable turntable for disc-type records, rotatably supported upon a housing. The device further includes a pair of recording and playback arms which comprise respective recording and playback heads swingable across a record disc from opposite sides of the center thereof. With this arrangement, a thin disc-shaped record having a rectangular peripheral configuration is utilized. The turntable has a recess of similar configuration formed thereon so that it cooperatively receives the record. When the disc-shaped record is operated on the turntable, it is driven at its periphery by means of the recess of the turntable. Such an arrangement has been found to achieve excellent performance when thin materials are used for the disc shaped records.

As a further aspect of this invention, a generally square-shaped record disc is utilized for recording and reproducing information in spirally arranged embossed grooves. This record is specially dimensioned and configured for economical and convenient mailability in a standard-sized envelope.

By further aspects of the present invention, additional desirable features may be included in the phonograph device, and the specification concludes with claims particularly pointing out and distinctly claiming the subject matter which we regard as our invention. The invention, however, as to organization and method of operation, together with further objects and advantages thereof, may best be understood by reference to the following description when taken in conjunction with the accompanying drawings, in which:

Figures 1, 2, 3:
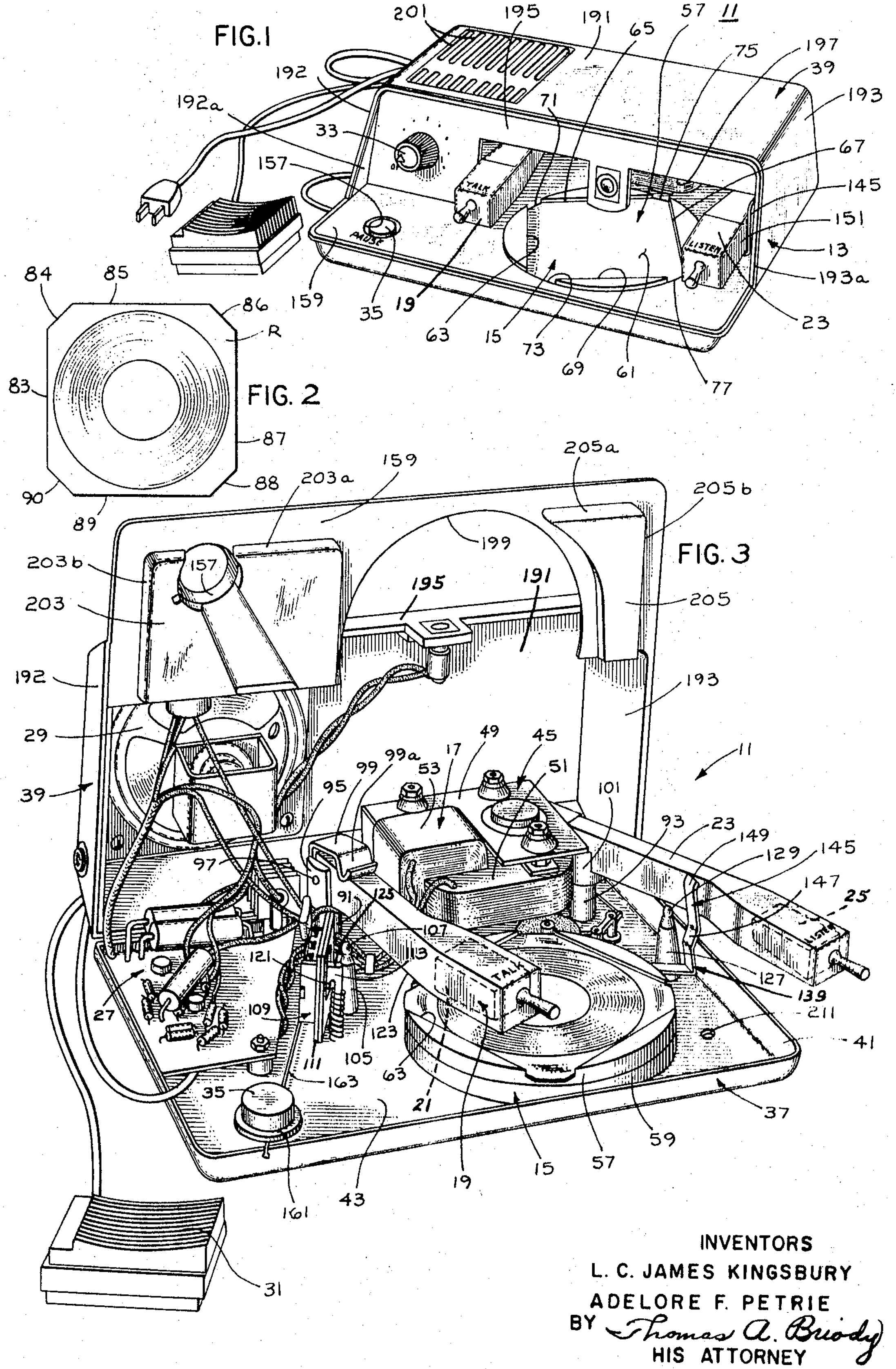
FIG. 1 is a perspective view of an embossable disc-type recording and reproducing device embodying the present invention, in one form, thereof.
FIG. 2 is a plan view of a disc-type record usable with the device of FIG. 1.
Figures 2A, 2B:
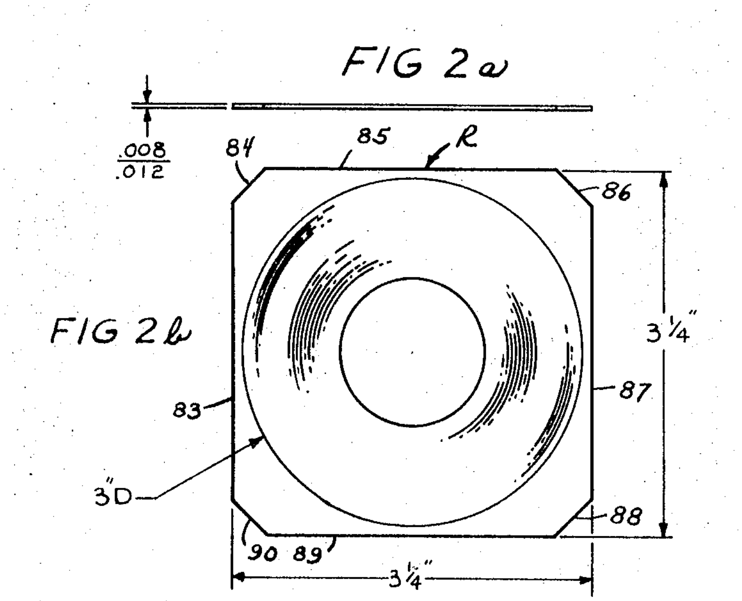
Figure 2C:
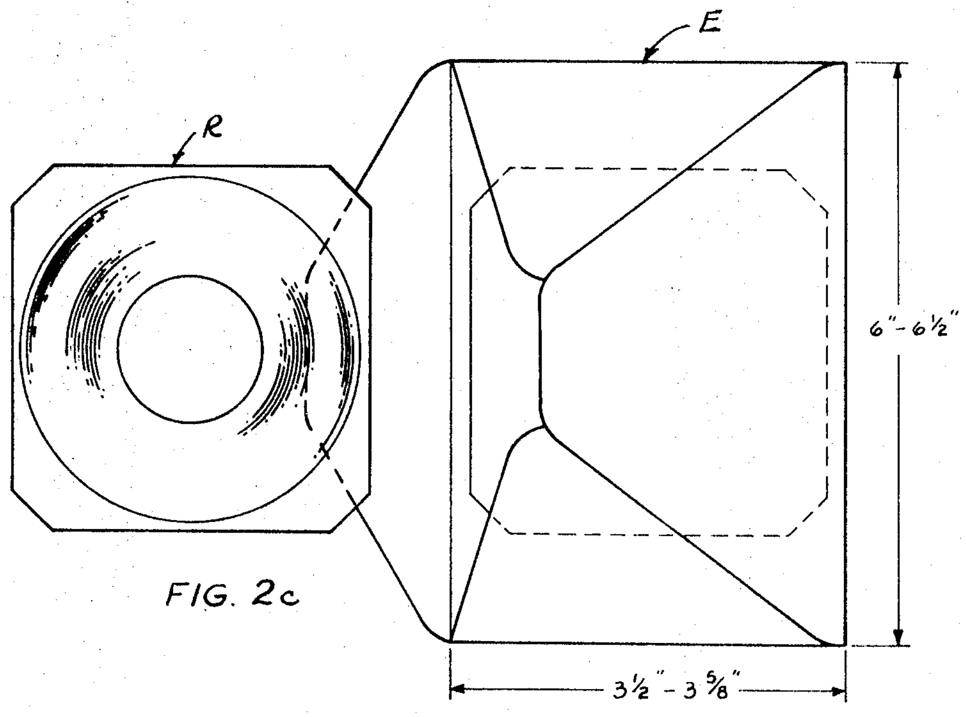
Figure 4:
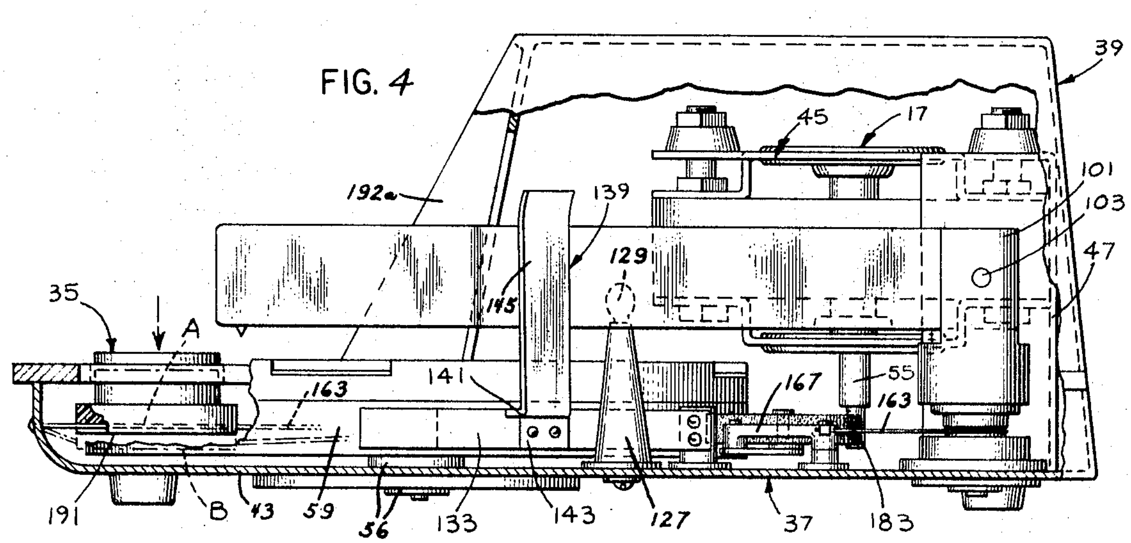
Figure 5:
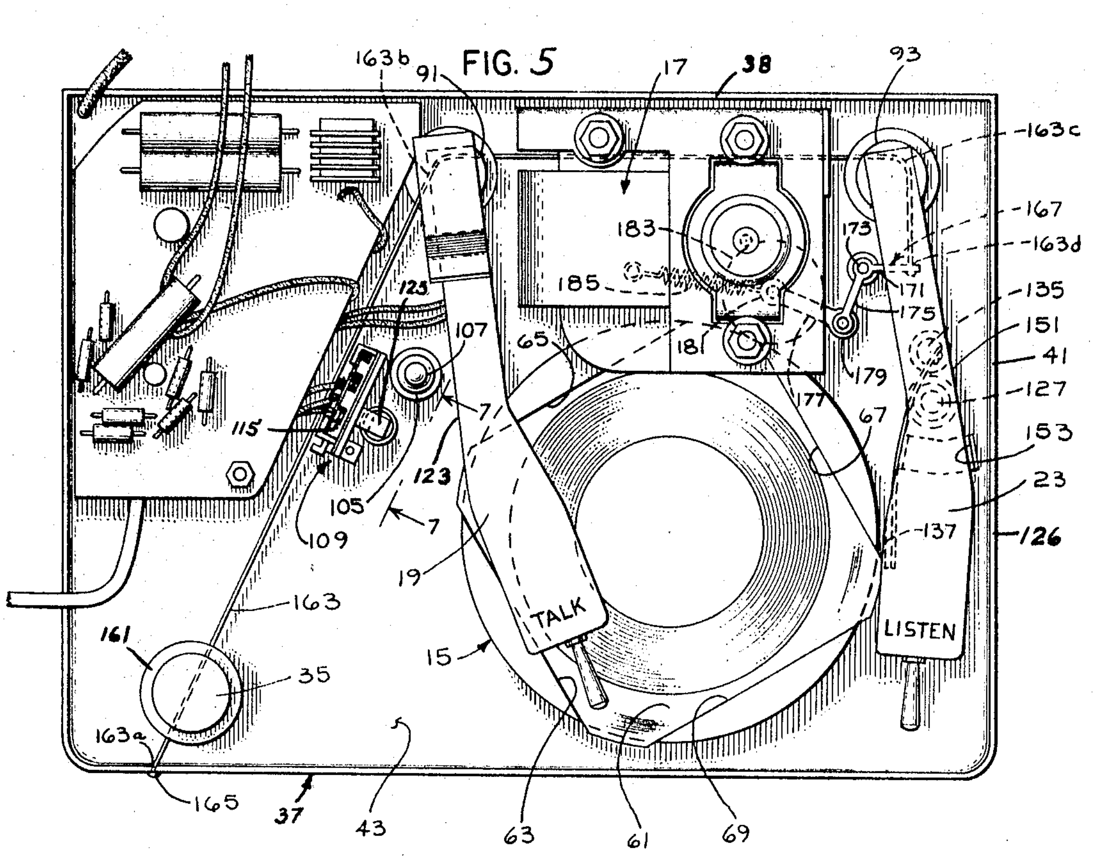
Figure 6:
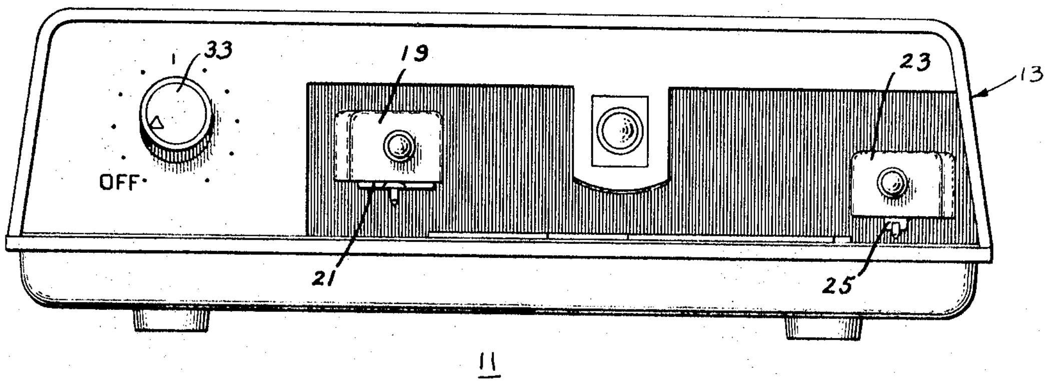
Figures 7, 8:
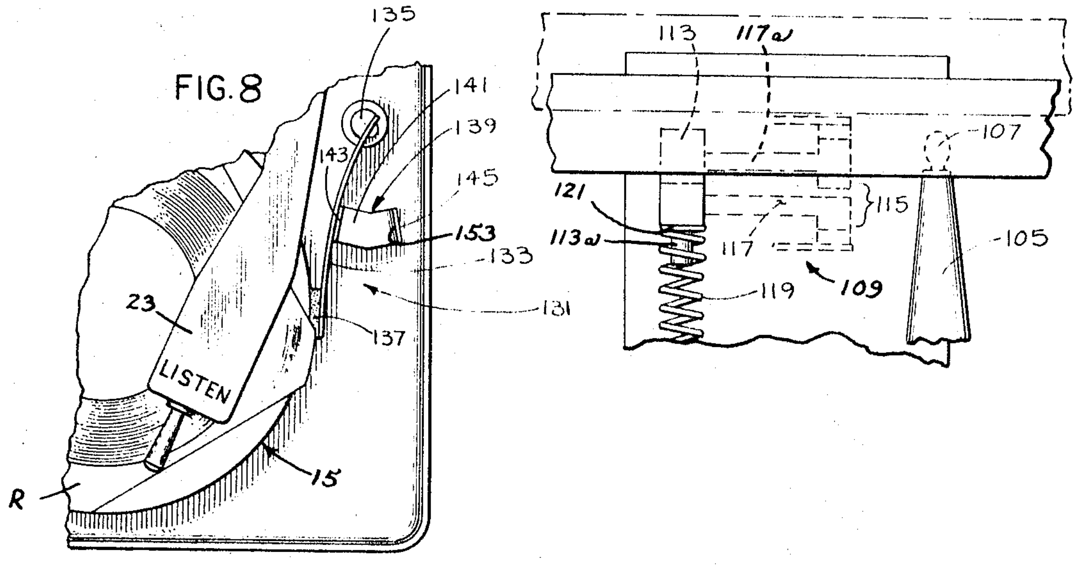

FIG. 2*a* is a front elevation or edge view of the record of FIG. 2;

FIG. 2*b* is an enlarged plan view of the record of FIG. 2;

FIG. 2*c* is a plan view of a record similar to FIG. 2*b*, but also showing the relative dimensions of a standard-sized envelope and how one of our records fits therein;

FIG. 3 is an enlarged perspective view of the device shown in FIG. 1, with the superstructure of the housing exploded and rotated by 90° from the main support to show the interior structural elements of the device;

FIG. 4 is a right end view of the device shown in FIG. 3, partially in section and partially broken away;

FIG. 5 is a plan view related to FIG. 3, of the main supporting section of the recording device with its components thereon;

FIG. 6 is a front view of the device;

FIG. 7 is a fragmentary side view taken from along the line 7–7 of FIG. 5, and showing the recording tone arm and its mode of cooperation with the switch; and FIG. 8 is a fragmentary plan view showing the playback arm on a record for the "listening" mode of operation.

Referring in detail to the drawing, and in particular to FIGS. 1 and 3 thereof, there is shown a disc-type recording and reproducing device 11 embodying one form of our invention. The recording device 11 essentially comprises a two-part housing 13 wherein turntable 15 and its driving motor 17 are located, recording arm 19 and its associated recording head 21, playback arm 23 and its associated playback head 25, amplifier 27, speaker 29, microphone 31, control knob 33, and pushbutton 35. Pushbutton 35 is called the "pause" control and is for selectively decoupling and coupling motor 17 to the turntable 15, thereby facilitating desired momentary interruption of the driven operation of the turntable 15. Knob 33 represents the "on-off" and "volume" control means, since it may be rotated to selectively energize amplifier 27 and to selectively vary the volume provided thereby.

As shown in FIG. 4, the housing 13 has a generally L-shaped profile provided by the complementary cooperation of a generally flat baseplate 37 and a generally L-shaped molded super structure 39.

The flat baseplate 37 includes a flanged rectangularly configured periphery 41 (FIG. 3) which extends upwardly in a generally vertical direction relative to the overall horizontal plane of main body 43 of plate 37. Periphery 41 of baseplate 37 thus forms an upstanding vertical lip for cooperating with superstructure 39.

For supporting motor 17, near the right side of the back of baseplate 37 (viewing FIG. 3) there is secured a substantially U-shaped bracket 45. The bracket 45 has an upwardly extensive vertical flange 47, as best shown in FIG. 4. Vertical flange 47 of the bracket is connected to an L-shaped upper horizontal plate 49 (FIG. 3). Motor 17 is of a suitable and well-known type, and includes a magnetic yoke 51 which carries a motor field coil 53, and a depending shouldered shaft 55 (FIG. 4) which is arranged to drive the turntable 15.

For carrying and revolving disc-type records, the turntable 15 is rotatably journaled at 56 (FIG. 4) for support by main body 43 of the baseplate 37. Turntable 15 is preferably approximately 4 inches in diameter and is specially designed to play a record R, as represented in FIG. 2. More particularly, turntable 15 includes a generally circular disc-shaped upper platform 57 which is cemented or otherwise secured to a circular disc-shaped lower platform 59 having substantially the same external diameter as that of upper platform 57.

Turning now to an important aspect of the present invention which concerns itself with the construction and arrangement of turntable 15 and the recording media therefor, attention is directed to FIGS. 1, 3 and 5. As shown therein, in the upwardly facing surface of upper platform 57 there is formed a generally square-shaped recess 61. It should be noted that recess 61 is not necessarily square shaped in configuration, since it does not include any corners as does the usual rectangle. Thus, as best shown in FIGS. 1 and 5, recess 61 includes four vertical walls 63, 65, 67 and 69, which are of equal length and arranged in rectangular fashion, but these walls are not connected together. Wall 63, which forms a vertical segment of the upper disc-shaped platform 57 (FIG. 5) merges at one of its ends into a curved interruption 71, and at the other of its ends into a curved interruption 73. Wall 65 forms a vertical segment of the upper disc-shaped platform 57 (FIG. 5) and merges at one of its ends (adjacent wall 63) into the curved interruption 71 and at the other of its ends (adjacent wall 67) into the curved interruption 75. Wall 67 forms a vertical segment of the upper disc-shaped platform 57 (FIG. 1) and merges at one of its ends (adjacent wall 65) into curved interruption 75 and at the other of its ends (adjacent wall 69) into curved interruption 77. Wall 69 forms a vertical segment of the upper disc-shaped platform 57 and merges at one of its ends (adjacent wall 67) into curved interruption 77 and at the other of its ends (adjacent wall 63) into curved interruption 73.

Record R is specially designed for peripheral cooperation with the recess 61 of turntable 15, and for this purpose it includes four equidistant sides 83, 85, 87 and 89 which are connected together by diagonally "squared" corners 84, 86, 88 and 90. Thus, more particularly, side 83 is arranged in perpendicular relationship to side 85 and is connected thereto by an angular edge 84. Side 85 is in generally perpendicular relationship with side 87 and is connected thereto by angular edge 86. Side 87 is in perpendicular relationship with side 89 and is connected thereto by angular edge 88. Side 89 is in generally perpendicular relationship with side 83 and is connected thereto by angular edge 90.

It will thus be seen that the configuration of the record R is generally octagonal since it includes eight sides. The side edges 83, 85, 87 and 89 of record R are each slightly longer than the associated vertical walls 63, 65, 67 and 69 of the turntable recess 61. Record R is thus dimensioned so that upon its insertion into recess 61, its edges 83, 85, 87 and 89 are in contiguity with, but each longer than, associated vertical walls 63, 65, 67 and 69 of the turntable recess. As shown best in FIG. 3, a corner portion of record R protrudes from each of the turntable interruptions 71, 73, 75 and 77, thereby enabling the record R to be readily grasped for convenient removal from turntable 15.

In most prior art disc-type recording blanks, the outer periphery thereof is circular and the blanks are rotatably driven by means of either an irregularly configured center hole or by a pin near the center. Such arrangements have been found to essentially limit the driving torque for thin materials. By using a recording blank having a generally square-shaped configuration for spiral-grooved embossable records R, a minimal amount of blank material is required, and the record R may be effectively driven at its periphery by means of cooperation with the walls of recess 61. Such a driving arrangement for record R has been found to provide very efficient operation in a recording and reproducing device.

A further significant advantage of the record R of the present invention, is that its configuration and dimension readily lends itself to convenient and economical "mailability." Thus, more particularly, as illustrated in FIG. 2*a*, the record R has a preferred thickness of between 0.008 inch and 0.012 inch, and as illustrated in FIG. 2*b*, record R also has a width of 3.250 inch and a length of 3.250 inch. The purpose of these dimensions is to enable the record R to be conveniently located in a standard-sized envelope E. Such an envelope, as illustrated representatively in FIG. 2*c*, has a length of between 6 inches and 6½ inches and a width of between 3½ inches and 3⅝ inches. As further shown in FIG. 2*c*, due to the dimensioning of record R, it may be readily inserted in the standard-sized envelope E. In view of the rectangular peripheral configuration of record R, coupled with the fact that it is designed to fit relatively snugly in the standard sized envelope E, there is very little tendency for the thin record R to "flop" around in the envelope or to tend to cut any part of the envelope. All the operator needs to do, in order to transmit his message through the U.S. Mail, is to insert the record R, in a properly addressed standard-sized envelope E, place a suitable postage stamp thereupon (e.g. 6 cent stamp for first class) and deposit the envelope in the U.S. Mail. As referred to herein, a "standard-sized personal-type envelope" means an envelope of such size as recommended for first class mail by the U.S. Post Office Department.

It will thus be seen that the record R of the present invention affords significant convenience in economical and efficient mailability.

For recording and reproducing information on the records R placed on turntable 15, we have provided the aforementioned recording arm 19 and playback arm 23. The recording arm 19 is supported for horizontal movement about a post 91. As shown in FIGS. 3 and 5, post 91 stems upwardly in perpendicular fashion from baseplate body 43, and is located near the rear-flanged portion 38 of baseplate 37, just to the left of the motor 17 (viewing FIG. 5). The playback arm 23 is supported for horizontal movement about post 93. Post 93 extends upwardly in perpendicular fashion from the baseplate body 43, and is positioned near the rear-flanged portion 38 thereof, on the right side of motor 17 and near the right rear corner of the baseplate 37 (viewing FIG. 5).

As further shown more particularly in FIG. 3, the supported end of recording arm 19 is pivotally supported in a U-shaped bearing yoke 95 for swiveling movements about horizontal and vertical axes. The yoke 95 is supported on post 91 for rotation about a vertical axis, and the supported end of recording arm 19 is supported on yoke 95 by pin 97 for rotation about a horizontal axis. Pin 97 thus extends through two vertical sides of rotatable yoke 95 and also extends through the two vertical sidewalls of the recording arm 19 to help pivotally support the recording arm 19 in trunnionlike fashion for movement about both the horizontal and vertical axes.

To exert the desired downward biasing force upon recording head 21 of the recording arm 19, the spring 99 is provided. Spring 99 is secured at one of its ends to yoke 95 and has its force transmitting portion 99*a* (FIG. 3) in normal engagement with the top surface of the recording arm 19 near its pivot pin 97.

The supported end of playback arm 23 is pivotally supported in a U-shaped bearing yoke 101 for swiveling movements about horizontal and vertical axes. Yoke 101 is thus supported on post 93 for rotation about a vertical axis, and the supported end of playback arm 23 is supported on yoke 101 by pin 103 (FIG. 4) for rotation about a horizontal axis. Pin 103 extends through two vertical sides of rotatable yoke 101 (FIG. 4) and also extends through the two sidewalls of the playback arm 23 to help pivotally support the playback arm 23 in trunnionlike fashion for movement about both the horizontal and vertical axes.

As shown in FIGS. 3 and 5, toward the front of baseplate 37 from post 91 and slightly to the left of post 91 (viewing FIG. 5), there is secured to baseplate 37 a pedestal 105. The pedestal 105 extends upwardly from flat body 43 of the baseplate 37. At the upper end of pedestal 105 it includes a bulbous portion 107 for resilient cooperation with a mating detent mechanism (not shown, e.g. two spring fingers which coact with bulbous portion 107) formed in a suitable recess on the underside of the recording arm 19. Thus, viewing FIG. 5, when the recording arm 19 is pivoted in a clockwise direction about its vertical axis from its recording position, it is set downwardly into engagement with bulbous portion 107 of the pedestal 105 to provide an inoperative detented storage or "rest" position for the recording arm 19.

There is provided adjacent to pedestal 105 and slightly to the left thereof (viewing FIG. 5), a slider-operated switch 109. The switch 109 includes a body portion 111 (FIG. 3), a spring-biased actuator 113, and a plurality of contact pairs 115. Contact pairs 115 are connected to an electronic circuit so that when movable contact 117 (FIG. 7) is in its uppermost position 117*a* (as shown suggestively by dotted lines in FIG. 7), the recording circuit is energized, and when the movable contact 117 is in its lower position (FIG. 7) a playback circuit is energized. The coiled spring 119 has its upper end extended around a downwardly depending arm portion 113a of actuator 113 and runs in normal compression between the upwardly facing surface of main body 43 of the baseplate 37 and a shoulder 121 of actuator 113 to normally bias actuator 113 into its uppermost position. In view of the compressive spring-biasing force exerted upon actuator 113 by spring 119, the actuator 113 normally urges the movable contacts 117 of switch 109 into a recording position for energizing the recording circuit.

When the recording arm 19 is pivoted in a clockwise direction about its vertical axis from the position wherein it is shown in FIG. 5 (i.e. its recording position), and then pushed downwardly into detented engagement with bulbous portion 107 of pedestal 105, the bottom of vertical wall 123 (FIG. 3) of the recording arm 19 thereupon engages the upper surface 125 of actuator 113 and forces actuator 113 downwardly against the upwardly directed biasing force of spring 119. The movable contacts 117 then move out of engagement with the fixed contacts required for energizing the recording circuit, and into engagement with alternate fixed contacts (e.g. the lower dotted fixed contact of FIG. 7) for energization of the playback circuit.

The aforementioned construction and arrangement of switch 109 and its actuation by recording arm 19 is described and claimed in the copending application Ser. No. 518,175 filed Jan. 3, 1966 of L. C. James Kingsbury, filed concurrently herewith and assigned to the same assignee as the present invention.

For a further understanding of the construction of the illustrated recording device 11 embodying the present invention, attention is directed to FIGS. 3, 5 and 8. As shown therein, midway between the front and back of baseplate 37 and near the right-flanged portion 126 thereof (viewing FIG. 5) is a pedestal 127. Pedestal 127 stems upwardly from the main body 43 of baseplate 37 and has an upper bulbous portion 129 for a detent type of cooperation with a mating mechanism (not shown) formed in a recess underneath of playback arm 23. Thus, when the playback arm 23 is rotated from its reproducing position shown in FIG. 8, in a counterclockwise direction, about its vertical axis, to the position where it is shown in FIG. 5, it is pushed downwardly so that its mating female detent mechanism (not shown) cooperates with pedestal 127 to normally maintain the playback arm in an inoperative or rest position.

To help increase the load required to drive turntable 15 during a record-reproducing cycle, brake mechanism 131 has been provided therefor (See FIG. 8). The brake mechanism 131 comprises a long leaflike element 133 which, as shown in FIG. 8, is secured at one end to upstanding post 135. The post 135 is located just a little distance behind pedestal 127. Leaf element 133 extends generally forwardly from post 135, but to the left of pedestal 127, in cantilever fashion (viewing FIG. 5). On the surface of the free end of leaf element 133 which faces the periphery of turntable 15, a brakeshoe 137 is secured to element 133. The leaf element 133 is at the same approximate vertical level as the lower platform 59 (FIG. 3) of the turntable 15 so that when the free end of element 133 flexes about post 135, brakeshoe 137 may be operated into frictional engagement with the outer periphery or rim of circular platform 59.

Between the supported end and the free end of brake leaf element 133, there is secured thereto a generally L-shaped actuator 139 (FIG. 8). Actuator 139 (which is best shown in FIGS. 3 and 8) includes a lower horizontal section 141 (FIG. 8) which is riveted via downturned flange 143 (FIG. 4) to element 133. The other end of lower horizontal section 141 of the actuator 139 (i.e. the right end, viewing FIG. 8) is connected to the bottom of vertical portion 145. As shown best in FIG. 3, the vertical portion 145 of actuator 139 is stepped at 147 and turned outwardly and upwardly at its upper free end 149, to enable it to be cammed by the playback arm 23.

When playback arm 23 is in the playback or "listening" mode, as shown in FIG. 8, the brakeshoe 137 is spring biased into frictional engagement with the outer rim of turntable platform 59. This provides an effective braking action upon the turntable 15 which is desirable in view of the relatively light tracking force applied to the record R by playback arm 23.

When the playback arm 23 is removed from record R for placement in its rest position, it is moved upwardly and rotated angularly in a counterclockwise direction from the position wherein it is shown in FIG. 8, into the position wherein it is shown in FIG. 5. The playback arm 23 is then pushed downwardly into detented cooperation with the upper bulbous part 129 of pedestal 127, where it assumes its detented "rest" position. During the course of rotation of playback arm 23 in a counterclockwise direction from its "operative" to "rest" positions, the outer vertical wall 151 (FIG. 1) of arm 23 engages the inner surface 153 (FIG. 8) of vertical portion 145 of the actuator 139, and operates leaf element 133 of the brake mechanism 131, against its normal biasing force, in the same counterclockwise direction about post 135. The brakeshoe 137 is thus moved away from the rim of platform 59 of the turntable 15, where it assumes an ineffective position with the playback arm 23 in its "rest" position (See FIG. 5). With no frictional resistance applied to turntable 15 by brake mechanism 131, the turntable load is reduced for the "recording" mode.

The aforementioned turntable brake mechanism 131 and the means for actuating this mechanism in response to movement of arm 23, is described in further detail and claimed in the copending application Ser. No. 518,352 filed Jan. 3, 1966 of L. C. James Kingsbury, filed concurrently herewith and assigned to the same assignee as the present invention.

For effectively operating the turntable 15 into a "pause" condition, there is also provided in recording device 11 a simplified pushbutton-actuated mechanism. More particularly, as shown in FIGS. 1 and 3, there is provided the pushbutton element 35 arranged to reciprocate vertically through an aperture 157 (FIG. 1) formed in deck 159 of housing superstructure 39. The pushbutton element 35 is dimensioned so that it may reciprocate through and be guided by aperture 157, and it includes an enlarged annular shoulder 161 (FIG. 3) for limiting its upward vertical movement (i.e. upward movement perpendicular to body 43 of the baseplate 37).

As shown in FIG. 5, a thin metal cable or string 163 is strung in tension from a suitable niche 165 formed in the left front of baseplate 37, around part of recording arm post 91, around part of playback arm post 93, to an L-shaped pivoted link 167. Thus, more particularly, end 163a of the flexible cable 163 is secured to niche 165 in the flanged front end of baseplate 37. Intermediate portion 163b of cable 163 is turned by a substantial acute angle of more than 45° from its original direction by means of its engagement with recording arm post 91. Near end portion 163c of cable 163 is turned by approximately a 90° angle via its engagement with playback arm post 93, and the other extreme end 163d of cable 163 is tied to the free end of arm 171 of pivoted L-shaped link 167. The link 167 is pivotally supported about an upright post 173, and the free end of its other arm 175 supports and is pivotally connected to idler arm 177. One end 179 of idler arm 177 is thus pivotally connected to and supported by link 167. The other end 181 of idler arm 177 pivotally supports idler wheel 183 and is connected to one end of a tension spring 185. The other end of tension spring 185 is suitably connected to the motor frame. (See FIG. 5).

To selectively couple and decouple the output of motor 17 to the turntable 15 and thereby furnish the "pause" mechanism for device 11, the idler wheel 183 is of appropriate diameter and is operated into and out of frictional engagement with both the bottom end of shouldered motor-driven shaft 55 (FIG. 4) and the rim of lower turntable platform 59, by the simple manipulation of pushbutton 35.

More particularly, the bottom 191 (FIG. 4) of pushbutton 35 continuously engages tensioned cable 163 and in the absence of the exertion of any downwardly directed manual force exerted upon the top surface of pushbutton 35, the cable 163 normally imparts a biasing force to the pushbutton 35 which maintains it in its outermost position. When pushbutton 35 is in its outermost position, spring 185 acts upon idler wheel arm 177 to maintain the idler wheel 183 in concurrent interengagement with motor pinion 55 and turntable 15.

When pushbutton 35 is manually operated downwardly from its outermost position to its innermost position, the force of the pushbutton 35 acting upon the cable 163, as indicated by the arrow in FIG. 4, moves the cable 163 underlying the pushbutton from position A to position B. This causes an increased tensional force to be exerted upon link 167 by cable 163, which tensional force overcomes the biasing force of idler spring 185 (FIG. 5). Link 167 thereupon rotates angularly in a counterclockwise direction so that idler wheel 183 is cranked into disengagement from pinion 55 and turntable 15. The idler wheel 183 is thus moved slightly downwardly and to the right from its FIG. 5 position, and the turntable 15 is deenergized.

The aforementioned "pause"-actuating mechanism and its mode of operation is further described and claimed in the copending application Ser. No. 518,381 filed Jan. 3, 1966 of L. C. James Kingsbury filed concurrently herewith and assigned to the same assignee as the present invention.

The superstructure 39 of the housing 13 comprises a generally flat top 191 (FIG. 1) conterminous at its sides with oppositely disposed and vertically arranged sidewalls 192 and 193 (FIG. 3). The front of top 191 of superstructure 39 is conterminous with the top of a sloped front wall 195, wall 195 being bounded on its sides by tapered forward extensions *192a*, *193a* of the sidewalls 192, 193, respectively. To facilitate an attractive and streamlined frontal appearance of the housing 13, the front wall 195 is sloped upwardly and rearwardly from its bottom, as suggested from viewing FIG. 1. The front wall 195 of the superstructure 39 has an elongated slot 197 therein, as illustrated in FIG. 1, to provide clearance for movement of recording arm 19 and the playback arm 23 and for access to the turntable 15. A substantial portion of turntable 15 extends outwardly from slot 197 to allow ready access to the turntable for the placement and removal of records R with respect thereto. The bottoms of frontal wall 195, and sides 192, 193 of the superstructure 39 are integrally connected to the horizontal deck 159 (FIGS. 1 and 3) which is stepped downwardly from the relatively larger top 191. Deck 159 extends forwardly in horizontal fashion from the bottom of frontal wall 195 for a considerable distance, as indicated in FIG. 1.

In deck 159 of the superstructure 39 there are formed a semicircular cutout section 199 (FIG. 3) and the circular aperture 157 for the pushbutton 35. When the superstructure 39 is secured into complementary engagement with baseplate 37, the semicircular cutout portion 199 of the deck 159 fits around and attractively accommodates approximately one-half or slightly more of the turntable 15, which is arranged therein in substantially flush fashion relative to the top surface of deck 159 (FIG. 4).

As shown best in FIG. 3, the loudspeaker 29 is secured to the underside of top 191 of the superstructure 39, near the left side thereof. To allow sound to readily emanate from loudspeaker 29, a series of elongated parallel cutout apertures 201 (FIG. 1) are formed in attractive fashion in top 191 above the speaker (i.e. near the left side of top wall 191).

To help facilitate the convenient attachment of superstructure 39 to baseplate 37, thereby forming a compact housing 13, it should be noted that as shown in FIG. 3, projections 203 and 205 are arranged on the bottom surface of forward deck 159. The projections 203 and 205 provide forward vertical positioning shoulders *203a*, *205a*, and have sideways positioning shoulders *203b*, *205b* formed thereon. For attachment of the front portion of the superstructure 39 to baseplate 37, the shoulders *203a*, *205a* are positioned in general contiguity with the inner vertical surface of the front flange portion of baseplate 37 and the outwardly facing shoulders *203b* and *205b* of the deck 159 of the superstructure 39 are arranged in general contiguity for the inner vertical surfaces of the left and right flanged portions of the baseplate 37 (viewing FIG. 3).

Thus, a screw may be extended upwardly from the bottom of the baseplate (for example through aperture 211, FIG. 3) and engaged with a threaded aperture (not shown) formed in projection 205, and a suitable screw may be extended upwardly through an aperture (not shown) on the other side of the baseplate and threaded into engagement with a suitable threaded aperture in projection 203, with the net effect of securing the superstructure into ready engagement with its associated baseplate to form the overall housing.

It will now, therefore, be seen that the present invention is an improved recording and reproducing device of novel and simplified construction. It will be further seen that there is also provided a novel and advantageous means for driving a record of the embossable disc type. It shall also be realized that a new, improved, economical, and readily mailable recording media has been produced.

While in accordance with the Patent Statutes, we have described what at present is considered to be the preferred embodiment of our invention, it will be obvious to those skilled in the art that various changes and modifications may be made therein without departing from this invention, and therefore, we aim in the following claims to cover all such equivalent variations as fall within the true spirit and scope of this invention.

What we claim as new and desired to secure by Letters Patent of the United States is:

We claim:

1. A Phonograph device comprising, a support, a rotatably driven turntable arranged on said support for carrying a record member, said turntable having an outer periphery and a noncircular recess formed on the upper face of said turntable for receiving said record member, said recess having a perimeter generally described by a noncircular vertical wall disposed inwardly from the outer periphery of said turntable, said vertical wall including at least one perimetrical interruption thereby to provide a lateral opening between said recess and the outer periphery of said turntable, said record member having a disc-type of configuration and a noncircular periphery contiguous to the vertical wall of said turntable, thereby enabling said record member to fit into and be driven by perimetrical engagement of the vertical wall of the turntable recess with the noncircular periphery of the record member, said record member also including a portion which is disposed within and protrudes beyond the perimetrical interruption of the vertical wall of said turntable recess, thereby to provide a manually engageable means for readily removing the record member from said turntable.

2. The phonograph and recording device as described in claim 1, wherein the recess in the upper face of said turntable has a generally rectangular configuration, and the periphery of said disc-shaped record member has a complementary generally rectangular configuration.

3. The phonograph and recording device as described in claim 1, wherein the recess of the turntable includes four equidistant vertical walls arranged in a generally square-shaped configuration.

4. The phonograph and recording device as described in claim 3, wherein said four vertical walls are each spaced apart from and perpendicular to associated adjacent walls of said recess and separated therefrom by said perimetrical interruptions in the peripheral wall of said turntable, said record member having a peripheral configuration comprising four equidistant edges, each of said equidistant edges having its ends adjacent to but separated from a pair of other associated equidistant edges by means of a relatively short edge.